(12) United States Patent
Hirose (10) Patent No.: US 8,333,066 B2
(45) Date of Patent: Dec. 18, 2012

(54) CATALYST TEMPERATURE INCREASING APPARATUS FOR HYBRID VEHICLE

(75) Inventor: Satoshi Hirose, Aichi-ken (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 633 days.

(21) Appl. No.: 12/519,481

(22) PCT Filed: Feb. 27, 2008

(86) PCT No.: PCT/JP2008/053901
§ 371 (c)(1),
(2), (4) Date: Jun. 16, 2009

(87) PCT Pub. No.: WO2008/120527
PCT Pub. Date: Oct. 9, 2008

(65) Prior Publication Data
US 2010/0043414 A1    Feb. 25, 2010

(30) Foreign Application Priority Data
Mar. 29, 2007  (JP) ................................ 2007-088234

(51) Int. Cl.
*F01N 3/10* (2006.01)
(52) U.S. Cl. ............... 60/300; 60/274; 60/284; 60/320
(58) Field of Classification Search .................. 60/300, 60/320
See application file for complete search history.

(56) References Cited

U.S. PATENT DOCUMENTS

| | | | |
|---|---|---|---|
| 3,886,739 A | 6/1975 | Lee | |
| 5,345,761 A | 9/1994 | King et al. | |
| 6,986,247 B1 * | 1/2006 | Parise | 60/284 |
| 7,150,147 B2 * | 12/2006 | Murata | 60/287 |

FOREIGN PATENT DOCUMENTS

| | | | |
|---|---|---|---|
| DE | 19646025 A1 | | 5/1998 |
| JP | 08-338235 A | | 12/1996 |
| JP | 11-178111 A | | 7/1999 |
| JP | 2001-073806 A | | 3/2001 |
| JP | 2006-132394 | * | 5/2006 |
| JP | 2006-132394 A | | 5/2006 |
| JP | 2006-170181 | * | 6/2006 |
| JP | 2006-170181 A | | 6/2006 |
| JP | 2007-326464 A | | 12/2007 |

OTHER PUBLICATIONS

German Office Action dated Sep. 23, 2011 and English-language translation thereof.

* cited by examiner

*Primary Examiner* — Thomas Denion
*Assistant Examiner* — Diem Tran
(74) *Attorney, Agent, or Firm* — Sughrue Mion, PLLC (57) ABSTRACT

An ECU executes a program including: detecting a catalyst temperature T upon start of an engine; outputting an instruction signal to drive a power module, which is disposed in contact with an outer surface of a catalyst and is high in heat resistance, with a low efficiency upon determination that the catalyst temperature need be increased; and outputting a valve opening instruction signal to a switch valve in a cooling system in such a manner as not to allow a coolant to flow in a coolant pipeline interposed between the power module and an electric part low in heat resistance.

8 Claims, 5 Drawing Sheets

CATALYST TEMPERATURE INCREASING APPARATUS FOR HYBRID VEHICLE

TECHNICAL FIELD

The present invention relates to a catalyst for an engine mounted on a hybrid vehicle and, more particularly, to a technique for effectively utilizing heat in a power module mounted on a hybrid vehicle so as to avoid any degradation of exhaust gas emission.

BACKGROUND ART

An exhaust gas system for an engine is generally provided with a catalyst converter for purifying specified components contained in exhaust gas. As such a catalyst converter is widely used a three-way catalyst converter for, with respect to specified three components contained in the exhaust gas, oxidizing carbon oxide (CO) and unburned hydrocarbon (HC) and reducing nitride oxide (NOx), so as to convert the components into carbon dioxide ($CO_2$), water vapor ($H_2O$), and nitrogen ($N_2$), respectively.

A catalyst included in the three-way catalyst converter is degraded in function at low temperatures. Therefore, the catalyst is unsatisfactorily burned unless the temperature of the catalyst is increased on an early stage at the time of cold starting, thereby raising a problem that the exhaust gas containing the specified three components, described above, therein in large quantities cannot be purified.

In the meantime, a hybrid vehicle becomes commercially practical, which is provided with an engine to be actuated by combustion energy of fuel and a motor to be actuated by electric energy as power sources during traveling of the vehicle, wherein an automatic transmission (including a power split mechanism) is interposed between the power sources and drive wheels. The above-described hybrid vehicle travels by independently using the engine and the motor according to, for example, an operational state, to thus reduce a fuel consumption or an exhaust gas quantity while maintaining a predetermined traveling performance. Specifically, there are a plurality of operational modes in different operational states of the engine and the motor: for example, an engine traveling mode, in which the vehicle travels by using only the engine as the power source; a motor traveling mode, in which the vehicle travels by using only the motor as the power source (while stopping the engine); an engine-motor traveling mode, in which the vehicle travels by using both of the engine and the motor as the power sources; and the like. These modes are designed to be automatically switched according to predetermined mode switching conditions expressed by, for example, a power source map using the operational states such as a vehicular speed (or a power source speed) and an acceleration operational amount as parameters. In other words, even if the vehicle travels, the engine may be intermittently operated.

Besides, there is a hybrid vehicle called a series type, that is, an electric automobile with an engine generator in which drive wheels are rotated by only a motor whereas an engine is actuated as a power supply source to a motor via the generator. In addition, there is a hybrid vehicle called a parallel type, in which wheels are directly driven by both of an engine and a motor, can travel while the motor assists power of the engine and electrically charges a battery as a generator.

Japanese Patent Laying-Open No. 2006-132394 discloses an exhaust gas purifier for a series type hybrid vehicle capable of efficiently purifying exhaust gas with certainty while suppressing an increase in cost. The exhaust gas purifier for the series type hybrid vehicle provided with a generator to be driven by an internal combustion engine, a battery to be electrically charged via an inverter by an output from the generator, and a motor receiving electric power from the battery via the inverter, is characterized by including exhaust gas purifying means disposed on an exhaust gas channel in the internal combustion engine and temperature increasing means for increasing the temperature of the exhaust gas purifying means upon the electric power supply from the battery via the inverter during stoppage of the internal combustion engine. Moreover, the exhaust gas purifier is characterized in that the exhaust gas purifying means is constituted of an oxidizing catalyst disposed on a front stage whereas a filter disposed on a rear stage for collecting particulate matters contained in the exhaust gas. Additionally, the exhaust gas purifier is characterized in that the filter is made of cordierite, and further, that the temperature increasing means is a heater disposed around the filter, for generating heat upon the electric power supply.

With the exhaust gas purifier for the series type hybrid vehicle, the exhaust gas purifier disposed on the exhaust gas channel in the internal combustion engine for the series type hybrid vehicle is increased in temperature by supplying the electric power to the temperature increasing means from the battery via the inverter during the stoppage of the internal combustion engine. Moreover, a so-called continuous regeneration type filter is used as the exhaust gas purifier, whereby hydrocarbon (HC) and carbon oxide (CO) contained in the exhaust gas are converted into carbon dioxide ($CO_2$) and water ($H_2O$), respectively, with the oxidizing catalyst disposed on the front stage, and nitrogen oxide (NO) contained in NOx is efficiently converted into nitrogen dioxide ($NO_2$), thereby temporarily increasing an $NO_2$ concentration whereas collecting PMs by the filter disposed on the rear stage, so that the PMs are burned with $NO_2$ produced on the front stage. Additionally, when the filter is made of cordierite without any electrification, the heater is disposed around the cordierite filter. The electric power is supplied to the heater so as to allow the heater to generate heat, thereby increasing the temperature of the cordierite filter.

Meanwhile, performance of an electronic part such as a thyristor or a power transistor to be mounted on the hybrid vehicle is remarkably enhanced, and accordingly, a heat generation amount from the electronic part (i.e., a heat generating element) becomes larger. In the meantime, in, for example, a hybrid vehicle mounting an induction motor and a DC battery thereon (including an electric automobile or a fuel cell vehicle), an inverter converts power so as to supply the power from the DC battery to the induction motor. A heat generation amount of the electronic part such as the inverter is also increased according to an increase in rated output of the induction motor, thereby requiring sufficient cooling measures.

For the vehicle, the electronic part is demanded to be reduced in size and thickness, in particular. Even on such a demand, the importance of a cooler for speedily radiating a large generated heat to the outside becomes higher in order to keep stability of operation. A heat sink, an air-cooled fan, a heat pipe, and a water-cooled unit are used singly or in combination for cooling the aforementioned electronic part. Among them, a water-cooled unit is used in the case of markedly large heat generation.

In this manner, an electronic part such as an IPM (abbreviating an Intelligent Power Module) or an IGBT (abbreviating an Insulated Gate Bipolar Transistor) mounted on a PCU (abbreviating a Power Control Unit) is cooled (hereinafter, electronic parts to be required to be cooled may be referred to as power modules).

That is to say, such a power module is thermally exchanged between the power module and a liquid refrigerant (i.e., coolant), and then, the liquid refrigerant is thermally exchanged between air and the same in a radiator. Finally, the heat of the power module is wasted.

However, even in the Japanese Patent Laying-open No. 2006-132394 stated above, the electric power is merely supplied to the heater via the inverter, to increase the temperature of the filter, but the heat generated in the power module of the inverter cannot be effectively utilized.

DISCLOSURE OF THE INVENTION

The present invention has been accomplished to solve the above-described problem. An object of the present invention is to provide a catalyst temperature increasing apparatus for a hybrid vehicle, in which heat generated in a power module for generating heat can be effectively used in warming a catalyst.

A catalyst temperature increasing apparatus for a hybrid vehicle according to a first aspect, includes: a catalyst purifying mechanism for purifying exhaust gas in the internal combustion engine; and electric equipment provided in such a manner as to be brought into contact with an outer surface of the catalyst purifying mechanism, the electric equipment being resistant against heat of a catalyst activation temperature or higher and generating heat by electrification.

According to the first aspect, the catalyst purifying mechanism for purifying the exhaust gas in the internal combustion engine cannot satisfactorily purify the exhaust gas at temperatures of a catalyst activation temperature or lower. Normally, the temperature of the catalyst purifying mechanism is increased by increasing the temperature of the exhaust gas owing to a spark retard, an increase in fuel injection quantity, or the like. In the hybrid vehicle, the internal combustion engine may be started during traveling by only the motor. In such a case, when, in particular, a high load is required in the internal combustion engine immediately after the start, much exhaust gas is discharged to the atmosphere while it remains not sufficiently purified when the temperature of the catalyst purifying mechanism remains at the activation temperature or lower. In contrast, when the vehicle travels only by the motor, the electric equipment such as an inverter including a power module is driven, and thus, the power module generates heat by electrification. The electric equipment is resistant against heat of the catalyst activation temperature or higher. The electric equipment is disposed in such a manner as to be brought into contact with an outer surface of the catalyst purifying mechanism. Therefore, the catalyst is increased in temperature via the outer surface of the catalyst purifying mechanism by the heat generated in the electric equipment by the electrification. Since the electric equipment is resistant against heat of the catalyst activation temperature or higher, it cannot be degraded in function or broken by the heat even after the catalyst is activated (e.g., it becomes higher in temperature than about 600° C.). As a consequence, it is possible to provide the catalyst temperature increasing apparatus for the hybrid vehicle, in which the heat generated in the power module can be effectively used in warming up the catalyst.

In the catalyst temperature increasing apparatus for a hybrid vehicle according to a second aspect, the electric equipment is equipment for controlling power supply to a motor generator, in addition to the constitution of the first aspect.

According to the second aspect, an inverter device, a converter device or the like provided on the hybrid vehicle as the electric equipment, for controlling the power supply to the motor generator is resistant against heat of a catalyst activation temperature or higher. The electric equipment is disposed in such a manner as to be brought into contact with the outer surface of the catalyst purifying mechanism. Therefore, the heat of the equipment for controlling the power supply to the motor generator which generates the heat by electrification achieves an increase in catalyst temperature via the outer surface of the catalyst purifying mechanism. Since the electric equipment is resistant against heat of the catalyst activation temperature or higher, it cannot be degraded in function or broken by the heat even after the catalyst is activated (e.g., it becomes higher in temperature than about 600° C.).

In the catalyst temperature increasing apparatus for a hybrid vehicle according to a third aspect, the electric equipment is an inverter device, the inverter device including a power module being resistant against heat of a catalyst activation temperature or higher and generating heat and an electric part inferior in heat resistance to the power module, wherein the power module is disposed in such a manner as to be brought into contact with the outer surface of the catalyst purifying mechanism whereas the electric part is disposed in such a manner as not to be brought into contact with the outer surface, in addition to the constitution of the first or second aspect.

According to the third aspect, the inverter device mounted on the hybrid vehicle as the electric equipment is constituted of the power module (being resistant against the heat of the catalyst activation temperature or higher) and the electric part inferior in heat resistance to the power module (it may not be resistant against the heat of the catalyst activation temperature or higher). The power module is disposed in such a manner as to be brought into contact with the outer surface of the catalyst purifying mechanism whereas the electric equipment is disposed in such a manner as not to be brought into contact with the outer surface of the catalyst purifying mechanism. Therefore, even if the electric equipment partly includes the electric part being low in heat resistance, it is possible to provide the catalyst temperature increasing apparatus for the hybrid vehicle, in which the heat generated in the power module can be effectively used in warming up the catalyst.

The catalyst temperature increasing apparatus for a hybrid vehicle according to a fourth aspect further includes a heat insulating member interposed between the power module and the electric part, in addition to the constitution of the third aspect.

According to the fourth aspect, the heat insulating material (glass wool for not positively insulating the heat, or a coolant passage or a cooling air passage for positively insulating the heat) is interposed between the power module and the electric part inferior in heat resistance to the power module. As a consequence, even if the power module is disposed in such a manner as to be brought into contact with the outer surface of the catalyst purifying mechanism, the heat insulating material can avoid the heat generated in the catalyst purifying apparatus from being transmitted from the catalyst purifying mechanism to the electric part having a low heat resistance via the power module.

In the catalyst temperature increasing apparatus for a hybrid vehicle according to a fifth aspect, the heat insulating member is a coolant pipeline which is connected to a heat radiator and in which a coolant is circulated, in addition to the constitution of the fourth aspect.

According to the fifth aspect, the coolant pipeline is interposed between the power module and the electric part inferior in heat resistance to the power module. The coolant, which is cooled (i.e., radiated) by the radiator, is circulated in the coolant pipeline. As a consequence, even if the power module is disposed in such a manner as to be brought into contact with the outer surface of the catalyst purifying mechanism, the heat insulating material can more securely avoid the heat generated in the catalyst purifying apparatus from being transmitted from the catalyst purifying mechanism to the electric part having a low heat resistance via the power module.

The catalyst temperature increasing apparatus for a hybrid vehicle according to a sixth aspect further includes a controller, in addition to the constitution of the fifth aspect. The controller determines whether or not the catalyst purifying mechanism need be warmed after the start of the internal combustion engine, so as to control a switch valve disposed on the coolant pipeline in such a manner that the coolant in the coolant pipeline does not flow in a heat radiator if it is determined that the warming is needed.

According to the sixth aspect, the coolant flowing in the coolant pipeline cannot flow to the radiator in the coolant pipeline disposed between the power module and the electric part when it is determined that the catalyst need be warmed up. As a consequence, the power module cannot be cooled with the coolant, so that the catalyst purifying mechanism can be increased in temperature with the heat generated in the power module.

The catalyst temperature increasing apparatus for a hybrid vehicle according to a seventh aspect further includes a controller, in addition to the constitution of any one of the first to third aspects. The controller determines whether or not the catalyst purifying mechanism need be warmed after the start of the internal combustion engine, so as to control the electric equipment in such a manner as to actuate the electric equipment with a low efficiency if it is determined that the warming is needed.

According to the seventh aspect, the electric equipment is operated with a low efficiency when it is determined that the catalyst need be warmed up. Therefore, the amount of heat generated in the electric equipment is increased. As a consequence, the heat generation quantity in the power module is further increased, thus speedily increasing the temperature of the catalyst purifying mechanism with the heat generated in the power module.

BEST MODES FOR CARRYING OUT THE INVENTION

Referring to the attached drawings, a description will be given below of a preferred embodiment according to the present invention. In the description below, the same component parts are designated by the same reference sign whose names and functions are the same. Therefore, their detailed description will not be repeated below. Incidentally, although the description is given to an engine provided with two three-way catalyst converters in the description below, the present invention is applicable to any engine provided with one or more three-way catalyst converters. In addition, a hybrid system is not limited as long as a vehicle is provided with a power module which generates heat (conversely, which need be cooled).

Figure 1:
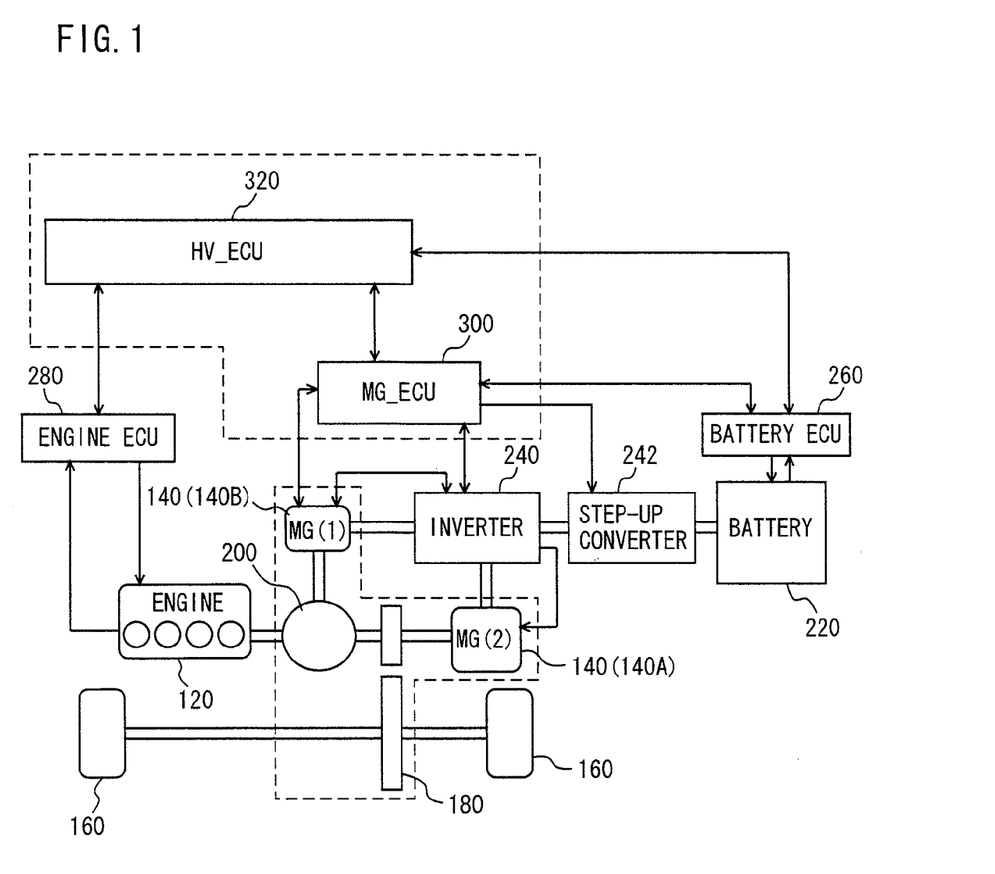
FIG. 1 is a control block diagram illustrating a hybrid vehicle as a whole including a catalyst temperature increasing apparatus according to a preferred embodiment of the present invention.

Referring to FIG. 1, a description will be given of a control block diagram illustrating a hybrid vehicle as a whole including a catalyst temperature increasing apparatus according to a preferred embodiment of the present invention. Incidentally, the present invention is not limited to the hybrid vehicle illustrated in FIG. 1. According to the present invention, an internal combustion engine (hereinafter referred to as an engine) such as a gasoline engine serving as a power source is used as a drive source for a vehicle, and further, as a drive source for a generator. Moreover, the present invention may be applied to a hybrid vehicle in another mode in which drive sources are an engine and a motor generator, wherein a vehicle can travel by power generated by the motor generator and has a battery mounted thereon that may stop the engine during the traveling. Such a battery is a nickel metal hydride battery or a lithium-ion battery irrespective of the kind. Alternatively, a capacitor may be used in place of the battery.

The hybrid vehicle includes an engine 120 and a motor generator (MG) 140. Hereinafter, for the sake of convenience of description, motor generator 140 is expressed by a motor generator 140A (or MG(2) 140A) and another motor generator 140B (or MG(1) 140B). According to a traveling state of the hybrid vehicle, motor generator 140A functions as a generator whereas motor generator 140B functions as a motor. When the motor generator functions as the generator, regenerative braking is achieved. Furthermore, when the motor generator functions as the generator, kinetic energy is converted into electric energy in the vehicle, so that the vehicle is reduced in speed.

Additionally, the hybrid vehicle includes: a speed reducer 180 for transmitting power generated in engine 120 or motor generator 140 to drive wheels 160 or transmitting the power of drive wheel 160 to engine 120 or motor generator 140; a power split device (e.g., a planetary gear mechanism, described later) 200 for distributing the power generated in engine 120 to two channels, that is, drive wheels 160 and motor generator 140B (MG(1) 140B); a battery 220 for electrically charging the electric power so as to drive motor generator 140; an inverter 240 for current control while exchanging a DC of battery 220 with ACs of motor generator 140A (MG(2) 140A) and motor generator 140B (MG(1) 140B); a battery control unit (hereinafter referred to as a battery ECU abbreviating an Electronic Control Unit) 260 for manageably controlling an electrically charged/discharged state (e.g., an SOC abbreviating a State of Charge) of battery 220; an engine ECU 280 for controlling the operational state of engine 120; an MG_ECU 300 for controlling motor generator 140, battery ECU 260, inverter 240, or the like according to the state of the hybrid vehicle; and an HV_ECU 320 for manageably controlling battery ECU 260, engine ECU 280, MG_ECU 300 or the like by turns, so as to control a hybrid system as a whole in such a manner as to enable the hybrid vehicle to most efficiently travel.

In the present preferred embodiment, a step-up converter 242 is interposed between battery 220 and inverter 240. Since a rated voltage of battery 220 is lower than those of motor generator 140A (MG(2) 140A) and motor generator 140B (MG(1) 140B), step-up converter 242 steps up the voltage of the electric power when the power is supplied from battery 220 to motor generator 140A (MG(2) 140A) or motor generator 140B (MG(1) 140B).

Although the ECUs are independently constituted in FIG. 1, an ECU may be constituted by integrating two or more ECUs with each other (exemplified by integrating MG_ECU 300 and HV_ECU 320 with each other, as indicated by a dotted line in FIG. 1).

In power split device 200, a planetary gear mechanism (i.e., a planetary gear) is used for distributing the power of engine 120 to both of drive wheel 160 and motor generator 140B (MG(1) 140B). Power split device 200 also functions as a continuously variable transmission by controlling the rotation speed of motor generator 140B (MG(1) 140B). The rotational force of engine 120 is inputted into a carrier (C), and then, is transmitted to motor generator 140B (MG(1) 140B) via a sun gear (S) while to motor generator 140A (MG(2) 140A) and an output shaft (on a side of drive wheel 160) via a ring gear (R). When rotating engine 120 is made to be stopped, the kinetic energy of the rotation of engine 120 is converted into the electric energy by motor generator 140B (MG(1) 140B) since engine 120 is rotated, thereby reducing the speed of engine 120.

In the hybrid vehicle mounting the hybrid system illustrated in FIG. 1 thereon, HV_ECU 320 controls engine 120 via motor generator 140A (MG(2) 140A) and engine ECU 280 in such a manner that the hybrid vehicle travels by only motor generator 140A (MG(2) 140A) out of motor generators 140 as soon as a predetermined condition of the vehicular state is established. The predetermined condition signifies that, for example, the SOC of battery 220 is higher than a predetermined value. In this manner, in the case where engine 120 is driven with low efficiency at the time of starting or during traveling at a low speed, the hybrid vehicle can travel only by motor generator 140A (MG(2) 140A). As a consequence, the SOC of battery 220 can be reduced (thereafter, battery 220 can be electrically charged during the stoppage of the vehicle).

During normal traveling, the power of engine 120 is distributed into the two channels by, for example, power split device 200. On one of the channels, drive wheel 160 is directly driven, whereas on the other channel, motor generator 140B (MG(1) 140B) is driven, so as to generate the power. At this time, motor generator 140A (MG(2) 140A) is driven by the generated power, thereby assisting the drive of drive wheel 160. Moreover, during the traveling at a high speed, the power from battery 220 is also supplied to motor generator 140A (MG(2) 140A), thereby increasing an output from motor generator 140A (MG(2) 140A), so as to add the drive force to drive wheel 160. In contrast, during a decrease in speed, motor generator 140A (MG(2) 140A) driven by drive wheel 160 functions as the generator, to carry out the regenerative generation, and then, charges the recovered power in battery 220. Here, in the case where an electric charge amount of battery 220 is reduced, and therefore, electric charging is particularly needed, output from engine 120 is increased such that a power generation amount by motor generator 140B (MG(1) 140B) is increased, and therefore, the electric charge amount of battery 220 is increased.

A target SOC of battery 220 is normally set to about 60% in such a manner as to recover the energy even whenever regeneration is carried out. In addition, an upper limit and a lower limit of the SOC are set to, for example, 80% and 30%, respectively, in order to suppress any battery degradation of battery 220. HV_ECU 320 controls the power generation, the regeneration, or the motor output by motor generator 140 in such a manner that the SOC cannot exceed the upper limit and the lower limit via MG_ECU 300. Incidentally, the values listed here are merely examples but are not limited to those.

Figure 2:
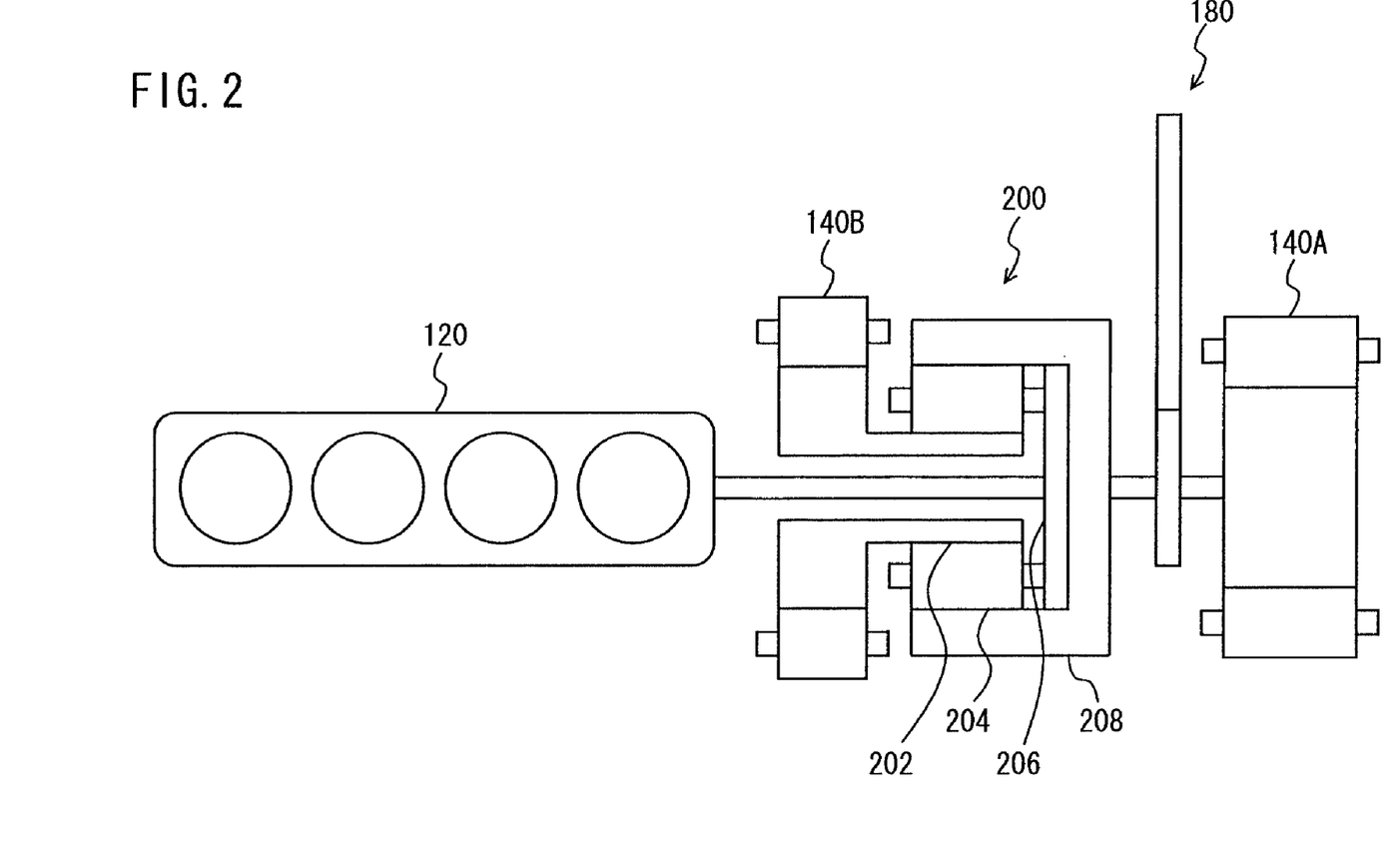
FIG. 2 describes a power split device.

Referring to FIG. 2, a further description will be given of power split device 200. Power split device 200 is constituted of a planetary gear including a sun gear (S) 202 (hereinafter simply referred to sun gear 202), a pinion gear 204, a carrier (C) 206 (hereinafter simply referred to carrier 206), and a ring gear (R) 208 (hereinafter simply referred to ring gear 208).

Pinion gear 204 meshes with sun gear 202 and ring gear 208. Carrier 206 supports pinion gear 204 in a rotatable manner. Sun gear 202 is connected to a rotary shaft of MG(1) 140B. Carrier 206 is connected to a crankshaft of engine 120. Ring gear 208 is connected to a rotary shaft of MG(2) 140A and speed reducer 180.

Engine 120, MG(1) 140B, and MG(2) 140A are connected to each other via power split device 200 constituted of the planetary gear, so that the speeds of engine 120, MG(1) 140B, and MG(2) 140A establish the interrelationship of connection via a straight line in a nomographic chart.

Figure 3:
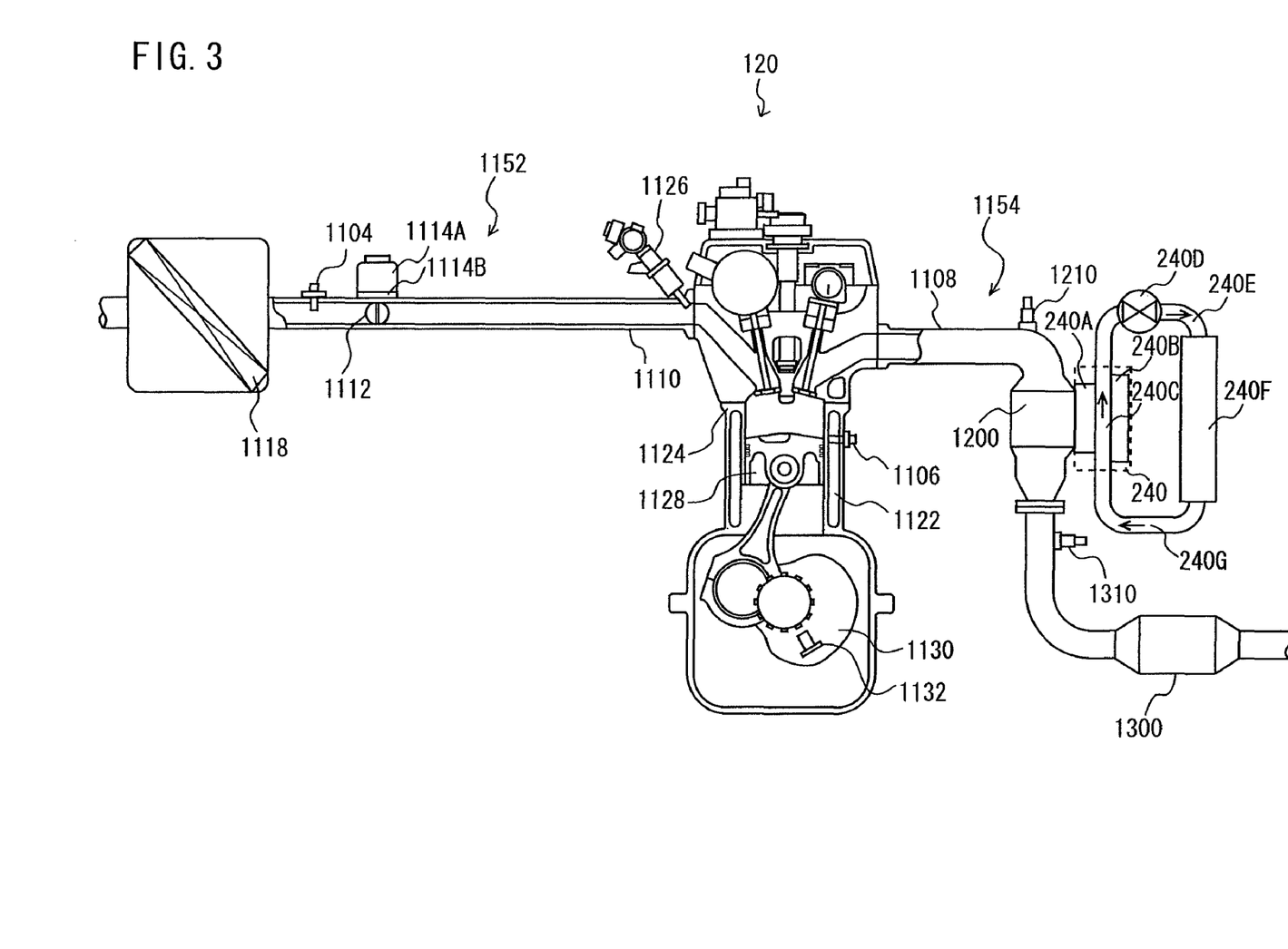
FIG. 3 is a control block diagram illustrating an engine provided with the catalyst temperature increasing apparatus according to the preferred embodiment of the present invention.

Referring to FIG. 3, a description will be given of engine 120 mounted on the hybrid vehicle. As illustrated in FIG. 3, to engine 120 are connected an intake system 1152 and an exhaust gas system 1154 including a first three-way catalyst converter 1200 and a second three-way catalyst converter 1300. Here, the number of three-way catalyst converters are not limited to two, but may be one or more.

Intake system 1152 includes an intake manifold 1110, an air cleaner 1118, an air flow meter 1104, a throttle motor 1114A, a throttle valve 1112, and a throttle position sensor 1114B.

Air taken in from air cleaner 1118 flows in engine 120 through intake manifold 1110. On the way of intake manifold 1110 is disposed throttle valve 1112. Throttle valve 1112 is opened or closed in such a manner that the air is supplied to engine 120 in a desired quantity by throttle motor 1114A operated in response to a control signal from engine ECU 280. At this time, an opening degree of throttle valve 1112 can be detected by throttle position sensor 1114B. Air flow meter 1104 is disposed on the intake manifold formed between air cleaner 1118 and throttle valve 1112, to detect the taken-in air quantity. And then, air flow meter 1104 transmits the resultant air quantity to engine ECU 280 as a suction intake quantity signal.

Engine 120 includes a coolant passage 1122, a cylinder block 1124, an injector 1126, a piston 1128, a crankshaft 1130, a water temperature sensor 1106, and a crank position sensor 1132.

Inside of cylinders in the number corresponding to that of cylinder blocks 1124 are disposed pistons 1128, respectively. Into a combustion chamber above pistons 1128 is introduced an air-fuel mixture consisting of fuel injected from injector 1126 and the taken-in air through intake manifold 1110, to be burned by ignition by an ignition plug whose ignition timing is controlled. When combustion is generated, piston 1128 is pushed down. At this time, a vertical motion of piston 1128 is converted into a rotational motion of crankshaft 1130 via a crank mechanism. Here, a rotation speed NE of engine 120 is detected by engine ECU 280 in response to a signal detected by crank position sensor 1132.

Inside cylinder block 1124 is formed coolant passage 1122, so that the coolant is circulated by the actuation of a water pump (not shown). The coolant flowing in coolant passage 1122 flows toward a radiator (not shown) connected to coolant passage 1122, to be then radiated by a cooling fan (not shown). On coolant passage 1122 is disposed water temperature sensor 1106 which detects the temperature of the coolant flowing in coolant passage 1122. Water temperature sensor 1106 transmits a value of the detected water temperature as a detection signal indicative of the temperature of the engine coolant.

Exhaust gas system 1154 includes an exhaust gas passage 1108, first three-way catalyst converter 1200 constituted integrally with an exhaust manifold of engine 120, and second three-way catalyst converter 1300 disposed on an under floor, in order to achieve an increase in temperature with the heat of engine 120. Upstream of first three-way catalyst converter 1200 and upstream of second three-way catalyst converter 1300 (i.e., downstream of first three-way catalyst converter 1200) are disposed air-fuel ratio sensors, respectively. Moreover, there are provided temperature sensors (not shown) for detecting the respective temperatures of first three-way catalyst converter 1200 and second three-way catalyst converter 1300.

In this manner, exhaust gas passage 1108 connected onto an exhaust gas side in engine 120 is connected to first three-way catalyst converter 1200 and second three-way catalyst converter 1300. In other words, the exhaust gas produced by the combustion of the air-fuel mixture staying inside of the combustion chamber in engine 120 first flows in first three-way catalyst converter 1200. HC and CO contained in the exhaust gas flowing in first three-way catalyst converter 1200 are oxidized in first three-way catalyst converter 1200. In the meantime, NOx contained in the exhaust gas flowing in first three-way catalyst converter 1200 is reduced in first three-way catalyst converter 1200. First three-way catalyst converter 1200 is disposed near engine 120 (it may be integrated with the exhaust manifold, as described above), and then, is speedily increased in temperature even during cold start of engine 120, so as to bring out a catalyst function.

Furthermore, the exhaust gas is fed from first three-way catalyst converter 1200 to second three-way catalyst converter 1300 for the purpose of its purification. First three-way catalyst converter 1200 and second three-way catalyst converter 1300 have basically the same structure and function.

A first air-fuel ratio sensor 1210 disposed upstream of first three-way catalyst converter 1200 and a second air-fuel ratio sensor 1310 disposed downstream of first three-way catalyst converter 1200 and upstream of second three-way catalyst converter 1300 detect the concentrations of oxygen contained in the exhaust gas passing through first three-way catalyst converter 1200 and second three-way catalyst converter 1300, respectively. The detection of the concentration of oxygen can lead to detection of a ratio of the fuel to the air contained in the exhaust gas, that is, an air-fuel ratio.

First air-fuel ratio sensor 1210 and second air-fuel ratio sensor 1310 each generate a current according to the concentration of the oxygen contained in the exhaust gas. The current is converted into, for example, a voltage, to be then inputted into engine ECU 280. Consequently, the air-fuel ratio of the exhaust gas staying upstream of first three-way catalyst converter 1200 can be detected in response to a signal output from first air-fuel ratio sensor 1210, whereas the air-fuel ratio of the exhaust gas staying upstream of second three-way catalyst converter 1300 can be detected in response to a signal output from second air-fuel ratio sensor 1310. First air-fuel ratio sensor 1210 and second air-fuel ratio sensor 1310, for example, generate a voltage of about 0.1 V when the air-fuel ratio is lean, whereas they generate a voltage of about 0.9 V when the air-fuel ratio is rich. A value obtained by converting the voltage into the air-fuel ratio is compared with a threshold of the air-fuel ratio, thereby controlling the air-fuel ratio by engine ECU 280.

First three-way catalyst converter 1200 and second three-way catalyst converter 1300 are characterized by the function of reducing NOx while oxidizing HC and CO when the air-fuel ratio is a theoretical air-fuel ratio, that is, the function of purifying HC, CO, and NOx at the same time.

A catalyst temperature increasing apparatus according to the present preferred embodiment is constituted by providing power module 240A, which is the constituent part of inverter 240, generating heat and having excellent heat resistance (e.g., 600° C.), in such a manner as to be brought into contact with the outer surface of first three-way catalyst converter 1200. That is to say, power module 240A whose device material is 4H—SiC or 6H—SiC and which has high heat resistance and high-density heat loss (e.g., 1 kW/cm$^2$) is provided in contact with the outer surface of first three-way catalyst converter 1200, and thus, heat transmission from power module 240A to first three-way catalyst converter 1200 increases the temperature of first three-way catalyst converter 1200. Here, although the catalyst temperature increasing apparatus according to the present preferred embodiment is provided only in first three-way catalyst converter 1200 in FIG. 3, the catalyst temperature increasing apparatus according to the present preferred embodiment may be provided also or only in second three-way catalyst converter 1300.

Inverter 240 is constituted of power module 240A described above and another inverter part 240B having a low heat resistance other than power module 240A. Since inverter part 240B does not have a very high heat resistance, it is provided with an insulator unit so as not to be adversely affected the heat transmission even if first three-way catalyst converter 1200 becomes high in temperature. In the present preferred embodiment, there is provided a coolant pipeline 240C as the insulator unit. Coolant pipeline 240C is interposed between power module 240A and inverter part 240B, which can be thus avoided from becoming high in temperature, so that power module 240A per se can be cooled in the case where first three-way catalyst converter 1200 becomes higher in temperature than the heat resistant temperature of power module 240A after an increase in catalyst temperature, thereby avoiding power module 240A from being excessively increased in temperature. Here, a heat insulating material such as glass wool or a cooling air passage may be used as the insulator unit in place of the coolant passage.

Incidentally, when power module 240A is driven with a low efficiency by, for example, instructing a gate voltage to become low, the heat generation quantity can be increased, so that an increase in temperature in first three-way catalyst converter 1200 can become speedy. In contrast, upon completion of the increase in temperature in first three-way catalyst converter 1200, an excessive heat generation can be avoided by driving power module 240A with a normal efficiency.

Besides inverter 240 (i.e., power module 240A and inverter part 240B) constituting the catalyst temperature increasing apparatus, there are provided coolant pipeline 240C described above, a radiator 240F serving as a heat radiator, a radiator-bound pipeline 240E for connecting coolant pipeline 240C and radiator 240F to each other, radiator return pipeline 240G for connecting radiator 240F and coolant pipeline 240C to each other, and a switch valve 240D disposed on radiator-bound pipeline 240E. Switch valve 240D can switch either communication state or non-communication state between coolant pipeline 240C and radiator-bound pipeline 240E by engine ECU 280 for controlling the present catalyst temperature increasing apparatus. In other words, in the case where power module 240A and/or inverter part 240B need be positively cooled on coolant pipeline 240C (i.e., in the case of completion of the increase in temperature in first three-way catalyst converter 1200), switch valve 240D is opened to achieve the communication state between coolant pipeline 240C and radiator-bound pipeline 240E, and thus, the temperature of the coolant is decreased by radiator 240F. In contrast, in the case where power module 240A and/or inverter part 240B need not be positively cooled on coolant pipeline 240C (i.e., in the case where the increase in temperature in first three-way catalyst converter 1200 is not completed yet), switch valve 240D is closed to achieve the non-communication state between coolant pipeline 240C and radiator-bound pipeline 240E, and thus, the coolant cannot flow in radiator 240F, so that the temperature of the coolant cannot be decreased. In the communication state between coolant pipeline 240C and radiator-bound pipeline 240E while switch valve 240D is opened, the coolant is circulated by the water pump, not illustrated.

The controller (exemplified above by engine ECU 280) in the catalyst temperature increasing apparatus according to the present preferred embodiment can be implemented by both of hardware constituted of mainly a digital circuit or an analog circuit and software constituted of mainly a CPU (abbreviating a Central Processing Unit) included in the ECU, a memory, and a program read from the memory and executed by the CPU. In general, it is advantageous in processing speed in the case of the hardware whereas it is advantageous in design change in the case of the software. Hereinafter, a description will be given of the case where the controller is implemented by the software. Here, a recording medium having such a program recorded thereon is one aspect of the present invention.

Figure 4:
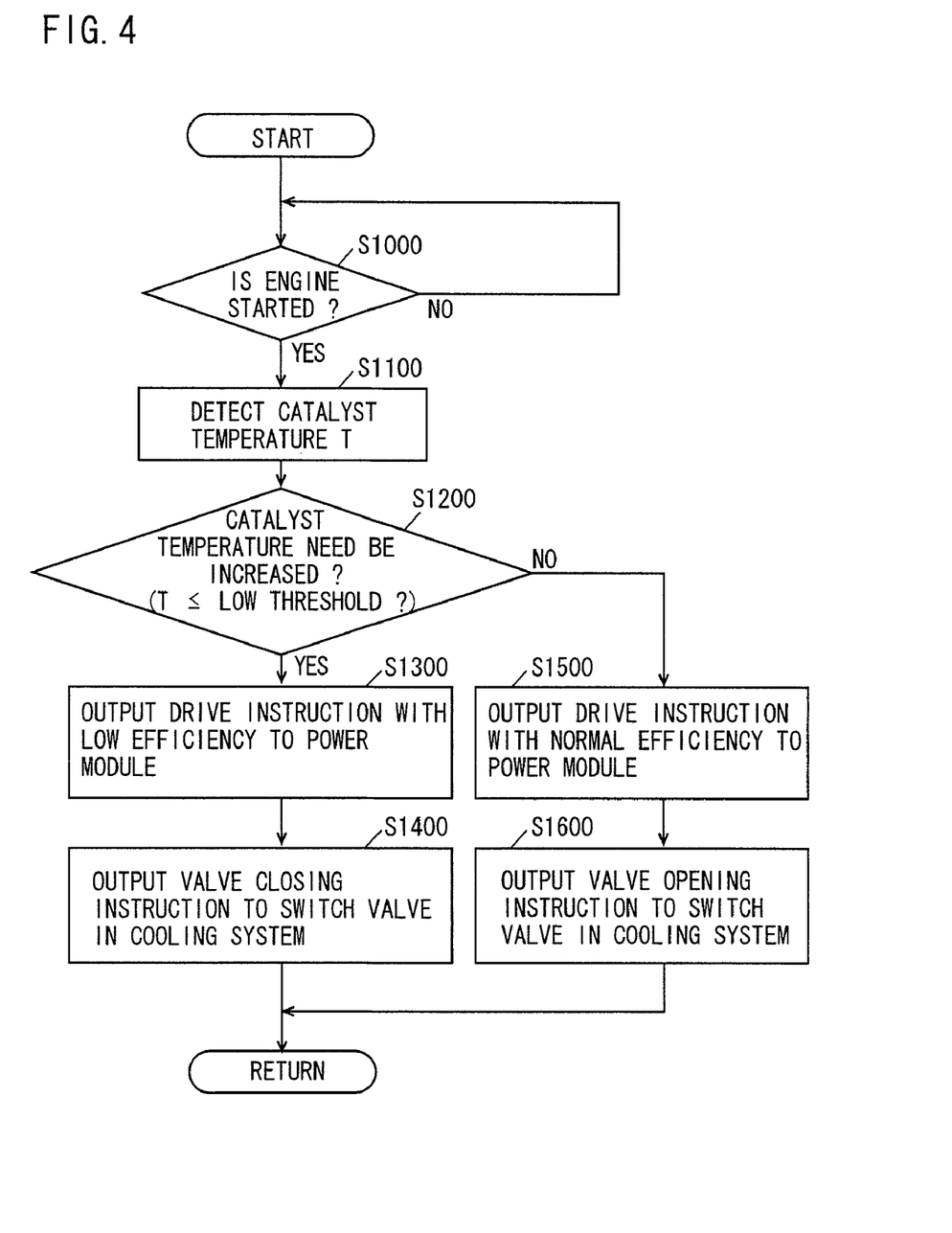
FIG. 4 is a flowchart illustrating a control structure of a program executed by an engine ECU for controlling the catalyst temperature increasing apparatus according to the preferred embodiment of the present invention.

Referring to FIG. 4, a description will be given of a control structure of the program executed by engine ECU 280 in order to implement the controller for controlling the catalyst temperature increasing apparatus according to the present preferred embodiment. Here, the program is a sub-routine, which is repeatedly executed in a predetermined cycle time.

In step (hereinafter abbreviated as S) 1000, engine ECU 280 determines whether or not engine 120 is started. Generally, engine ECU 280 determines based on an operational instruction of engine 120 from HV_ECU 320 that engine 120 is started when inoperative engine 120 is cranked by a starter motor, and then, the air-fuel mixture is continuously ignited by air intake and fuel injection. If it is determined that engine 120 is started (YES in S1000), the processing proceeds to S1100. If not (NO in S1000), the processing returns to S1000, and waits until engine 120 is restarted. Incidentally, in the case of NO in S1000, the processing (i.e., the sub-routine) may come to an end. Moreover, the start of engine 120 is detected in S1000 irrespective of the traveling of the hybrid vehicle, while including detection at the time of the restart after engine 120 is temporarily stopped. Since the processing is the sub-routine, the processing in S1000 is performed also after the start of engine 120. In this case (in the case where engine 120 is continued to be operated), YES is determined in S1000.

In S1100, engine ECU 280 detects a temperature T of first three-way catalyst converter 1200.

In S1200, engine ECU 280 determines whether or not first three-way catalyst converter 1200 need be increased in temperature. For example, engine ECU 280 determines that first three-way catalyst converter 1200 need be increased in temperature when temperature T of first three-way catalyst converter 1200 is a low threshold or lower. When it is determined that first three-way catalyst converter 1200 need be increased in temperature (YES in S1200), the processing proceeds to S1300. If not (NO in S1200), the processing proceeds to S1500.

In S1300, engine ECU 280 outputs an instruction signal in such a manner that power module 240A in inverter 240 is driven with a low efficiency. At this time, inverter 240 is controlled not directly by engine ECU 280 but by MG_ECU 300. As a consequence, engine ECU 280 outputs an instruction signal to MG_ECU 300 via HV_ECU 320 in such a manner that power module 240A is driven with the low efficiency.

In S1400, engine ECU 280 outputs a valve closing instruction signal to switch valve 240D in the cooling system. Here, the water pump is stopped to be actuated. Thereafter, the processing comes to an end.

In the meantime, in S1500, engine ECU 280 outputs an instruction signal in such a manner that power module 240A in inverter 240 is driven with a normal efficiency. Like in S1300, also at this time, inverter 240 is controlled not directly by engine ECU 280 but by MG_ECU 300. As a consequence, engine ECU 280 outputs an instruction signal to MG_ECU 300 via HV_ECU 320 in such a manner that power module 240A is driven with the normal efficiency.

In S1600, engine ECU 280 outputs a valve opening instruction signal to switch valve 240D in the cooling system. Here, the water pump is started to be actuated. Thereafter, the processing comes to an end.

Incidentally, if the determination result is YES in S1200, the processing in at least either one of S1300 and S1400 may be performed, in contrast, if the determination result is NO in S1200, the processing in at least either one of S1500 and S1600 may be performed.

Next, a description will be given of the operation of engine 120 to be controlled by engine ECU 280 serving as the controller for controlling the catalyst temperature increasing apparatus according to the present preferred embodiment with the above-described structure and based on the above-described flowchart.

Case Where First Three-Way Catalyst Converter is Low in Temperature

When engine 120 is started (YES in S1000), temperature T of first three-way catalyst converter 1200 is detected (S1100). Since detected temperature T of first three-way catalyst converter 1200 is the low threshold or lower (YES in S1200), it is determined that the temperature of first three-way catalyst converter 1200 need be increased.

Power module 240A disposed in close contact with the outer surface of first three-way catalyst converter 1200 is driven with the low efficiency (S1300). In this manner, power module 240A further generates heat, to efficiently increase the temperature of first three-way catalyst converter 1200.

Moreover, switch valve 240D is closed (S1400), and therefore, the coolant flowing on coolant pipeline 240C passing through the inside of inverter 240 cannot be circulated between radiator 240F and the same. Consequently, the coolant flowing on coolant pipeline 240C cannot cool power module 240A, so that the heat generated by power module 240A is efficiently transmitted to first three-way catalyst converter 1200. In this case, the coolant remaining inside of coolant pipeline 240C functions as a heat insulator between inverter part 240B and power module 240A and between inverter part 240B and first three-way catalyst converter 1200.

In this manner, in the case where first three-way catalyst converter 1200 need be increased in temperature, power module 240A is operated with the low efficiency, and further, is not cooled with the coolant. As a consequence, the heat generated in power module 240A can be efficiently transmitted to first three-way catalyst converter 1200, thereby speedily increasing first three-way catalyst converter 1200 in temperature.

Case Where First Three-Way Catalyst Converter is High in Temperature

When engine 120 is started (YES in S1000), temperature T of first three-way catalyst converter 1200 is detected (S1100). Since detected temperature T of first three-way catalyst converter 1200 is higher than the low threshold (NO in S1200), it is determined that the temperature of first three-way catalyst converter 1200 need not be increased. That is to say, the temperature of first three-way catalyst converter 1200 is high enough to satisfactorily exhibit a purifying function.

Power module 240A disposed in close contact with the outer surface of first three-way catalyst converter 1200 is driven with the normal efficiency (S1500). In this manner, power module 240A merely generates the heat in the normal use state.

Moreover, switch valve 240D is opened (S1600), and therefore, the coolant flowing on coolant pipeline 240C passing through the inside of inverter 240 can be circulated between radiator 240F and the same, thereby decreasing the temperature of the coolant. Consequently, the coolant flowing on coolant pipeline 240C positively cools power module 240A and inverter part 240B. Even if first three-way catalyst converter 1200 is further increased in temperature by the exhaust gas, it is possible to avoid power module 240A and inverter part 240B from being excessively increased in temperature. In this case, the coolant circulating between coolant pipeline 240C and radiator 240F functions of cooling power module 240A per se, and further, of cooling the heat insulators between inverter part 240B and power module 240A and between inverter part 240B and first three-way catalyst converter 1200 and inverter part 240B per se.

In this manner, in the case where first three-way catalyst converter 1200 need not be increased in temperature, power module 240A is operated with the normal efficiency, and further, is cooled with the coolant. As a consequence, power module 240A per se is positively cooled with the coolant, and therefore, even power module 240A in contact with the outer surface of first three-way catalyst converter 1200 which is high in temperature cannot be increased in temperature beyond a heat resistant temperature. Additionally, inverter part 240B which is inherently low in heat resistance is positively cooled with the coolant, and therefore, cannot be increased in temperature beyond the heat resistant temperature.

As described above, with the catalyst temperature increasing apparatus according to the present preferred embodiment, (1) it is possible to efficiently achieve the increase in catalyst temperature without adding any new matter by using waste heat of the power module high in heat resistance in increasing the catalyst temperature while avoiding any excessive increase in temperature of the inverter part low in heat resistance;

(2) the power module is operated with the low efficiency in such a manner that the more heat generation quantity by the power module is obtained when the catalyst temperature is positively increased, and additionally/alternatively, the coolant cannot be circulated between the power module and the radiator, thereby achieving the more heat generation quantity by the power module, so as to efficiently increase the catalyst temperature; and (3) the power module is operated with the normal efficiency when the catalyst temperature is not positively increased (i.e., the catalyst is sufficiently high in temperature), and additionally/alternatively, the coolant is circulated between the power module and the radiator, thereby positively cooling the power module and the inverter part so that the temperatures of the power module and the inverter part cannot exceed the respective heat resistant temperatures.

<Modifications>

Figure 5:
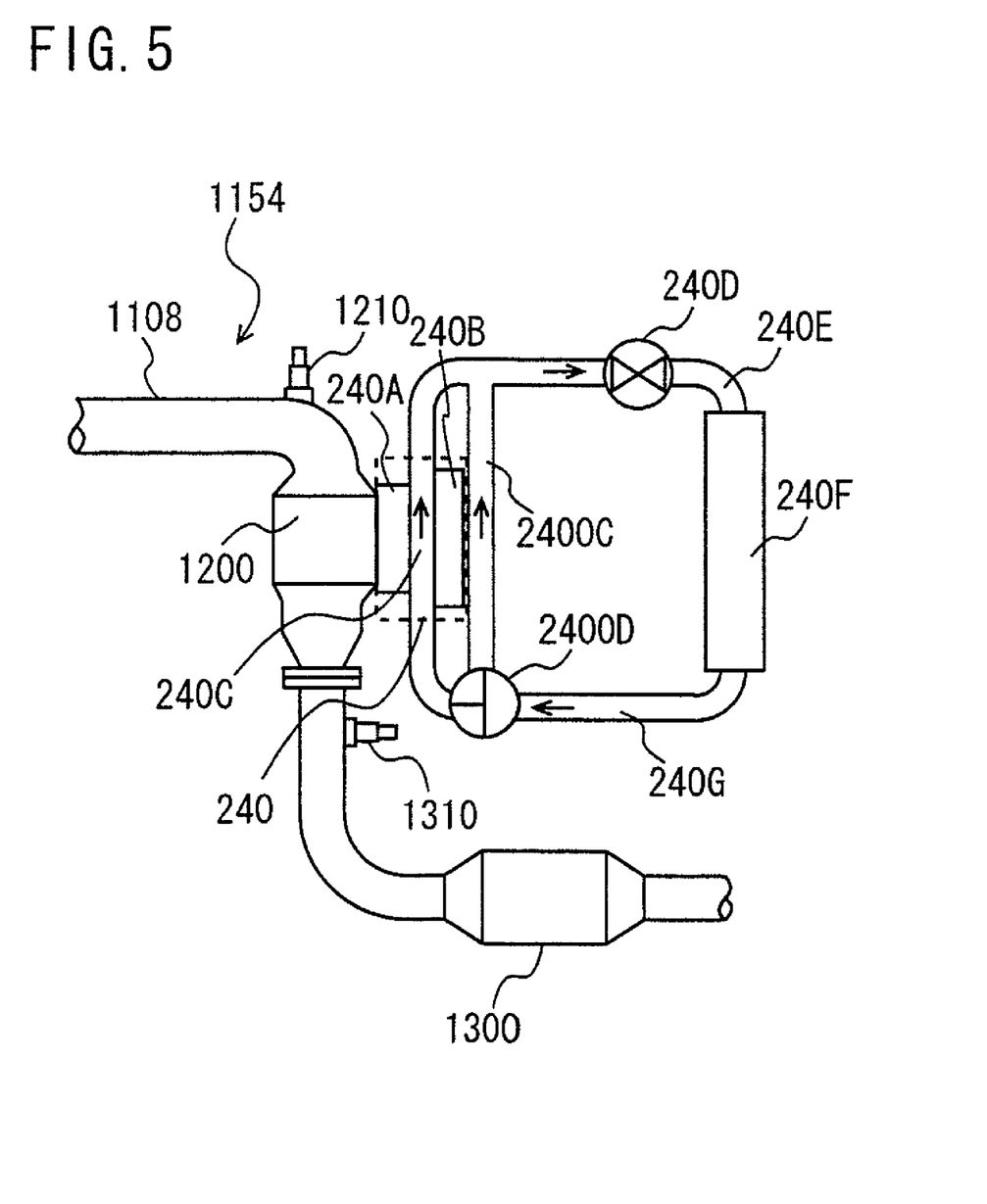
FIG. 5 is a control block diagram illustrating an engine provided with the catalyst temperature increasing apparatus according to a modification of the preferred embodiment of the present invention.

Referring to FIG. 5, a description will be given below of a modification of the catalyst temperature increasing apparatus according to the present preferred embodiment. FIG. 5 shows only the exhaust gas system illustrated in FIG. 3. In FIG. 5, the same constituents as those illustrated in FIG. 3 are designated by the same reference signs. Their functions are the same. Therefore, their detailed description will be not given here.

In the present modification, in addition to the above-described preferred embodiment, there are provided a coolant pipeline 2400C for cooling only an inverter part 240B and a three-way valve 2400D capable of switching a first state, in which coolant cannot be allowed to flow from a radiator 240F to either coolant pipeline 2400C or another coolant pipeline 240C (here, the first state can be achieved by closing a switch valve 240D so as not to circulate the coolant or by making a water pump inoperative), a second state, in which the coolant is allowed to flow from radiator 240F to both of coolant pipeline 2400C and coolant pipeline 240C (in the second state, switch valve 240D is opened whereas the water pump is operated), and a third state, in which the coolant is allowed to flow from radiator 240F to coolant pipeline 2400C whereas the coolant is not allowed to flow from radiator 240F to coolant pipeline 240C (in the third state, switch valve 240D is opened whereas the water pump is operated).

For example, in the case where only inverter part 240B is cooled, three-way valve 2400D is switched to the above-described third state. In the case where both of a power module 240A nor inverter part 240B is cooled, three-way valve 2400D is switched to the above-described second state. Alternatively, in the case where neither of power module 240A nor inverter part 240B is cooled, three-way valve 2400D is switched to the above-described first state.

In the third state in the above-described modification, although power module 240A cannot be cooled since a catalyst is increased in temperature, inverter part 240B can be positively cooled owing to its low heat resistance.

It is to be understood that the preferred embodiments disclosed herein should be illustrative and non-restrictive in every aspect. The scope of the present invention is defined by the terms of the claims, rather than the description above, and is intended to include any modifications within the scope and meaning equivalent to the terms of the claims.

The invention claimed is:

1. A catalyst temperature increasing apparatus comprising:
a catalyst purifier which purifies exhaust gas in an internal combustion engine of a hybrid vehicle; and
electric equipment provided in such a manner as to be brought into contact with an outer surface of said catalyst purifier, said electric equipment being resistant against heat of a catalyst activation temperature or higher and generating heat by electrification,
wherein said electric equipment is configured to control and supply electric power to a motor generator and to generate heat during supplying electric power to the motor generator.

2. The catalyst temperature increasing apparatus according to claim 1, further comprising a controller which determines whether or not said catalyst purifier needs warming after the start of said internal combustion engine, so as to control said electric equipment in such a manner as to actuate said electric equipment with a low efficiency if it is determined that the warming is needed.

3. The catalyst temperature increasing apparatus according to claim 1, wherein said electric equipment is an inverter device,
   said inverter device including a power module being resistant against heat of a catalyst activation temperature or higher and generating heat and an electric part inferior in heat resistance to said power module;
   wherein said power module is disposed in such a manner as to be brought into contact with the outer surface of said catalyst purifier whereas said electric part is disposed in such a manner as not to be brought into contact with said outer surface.

4. The catalyst temperature increasing apparatus according to claim 3, further comprising a heat insulating member interposed between said power module and said electric part.

5. The catalyst temperature increasing apparatus according to claim 4, wherein said heat insulating member is a coolant pipeline which is connected to a heat radiator and in which a coolant is circulated.

6. The catalyst temperature increasing apparatus according to claim 5, further comprising a controller which determines whether or not said catalyst purifier needs warming after the start of said internal combustion engine, so as to control a switch valve disposed on said coolant pipeline in such a manner that the coolant in said coolant pipeline does not flow in a heat radiator if it is determined that said warming is needed.

7. The catalyst temperature increasing apparatus according to claim 3, further comprising a controller which determines whether or not said catalyst purifier needs warming after the start of said internal combustion engine, so as to control said electric equipment in such a manner as to actuate said electric equipment with a low efficiency if it is determined that the warming is needed.

8. A catalyst temperature increasing apparatus comprising:
   a catalyst purifier which purifies exhaust gas in an internal combustion engine of a hybrid vehicle; and
   electric equipment provided in such a manner as to be brought into contact with an outer surface of said catalyst purifier, said electric equipment being resistant against heat of a catalyst activation temperature or higher and generating heat by electrification, wherein said electric equipment is an inverter device and wherein the inverter device is used for controlling an electric power supply to a motor generator.

* * * * *